United States Patent
Cui et al.

(10) Patent No.: US 11,468,348 B1
(45) Date of Patent: Oct. 11, 2022

(54) CAUSAL ANALYSIS SYSTEM

(71) Applicant: Amazon Technologies, Inc., Seattle, WA (US)

(72) Inventors: Can Cui, Seattle, WA (US); Nikolaos Chatzipanagiotis, Seattle, WA (US); Tamal Krishna Kuila, West Bengal (IN); Narayanan Sadagopan, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 429 days.

(21) Appl. No.: 16/788,100

(22) Filed: Feb. 11, 2020

(51) Int. Cl.
*G06N 20/00* (2019.01)
*G06N 5/04* (2006.01)
*G06K 9/62* (2022.01)
*G06N 3/04* (2006.01)

(52) U.S. Cl.
CPC ............ *G06N 5/04* (2013.01); *G06K 9/6228* (2013.01); *G06N 3/04* (2013.01); *G06N 20/00* (2019.01)

(58) Field of Classification Search
CPC .......... G06K 9/6228; G06N 3/04; G06N 5/04; G06N 20/00; G06N 20/20; G05B 19/41885; G06F 16/954; G06Q 10/10; G06Q 20/123; G06Q 30/0246; G06Q 30/02; H04L 63/1483; H04N 21/4622
See application file for complete search history.

(56) References Cited

U.S. PATENT DOCUMENTS

| | | | |
|---|---|---|---|
| 2001/0056405 A1* | 12/2001 | Muyres | G06Q 20/123 705/52 |
| 2002/0112237 A1* | 8/2002 | Kelts | G06F 16/954 725/135 |
| 2002/0120921 A1* | 8/2002 | Coburn | G05B 19/41885 703/21 |
| 2003/0126613 A1* | 7/2003 | McGuire | H04N 21/4622 715/745 |
| 2004/0138932 A1* | 7/2004 | Johnson | G06Q 10/10 705/7.36 |
| 2006/0253458 A1* | 11/2006 | Dixon | H04L 63/1483 |

(Continued)

OTHER PUBLICATIONS

Alberto Abadie, et al., "Semiparametric Difference-in-Differences Estimators", The Review of Economic Studies 72.1 (2005) pp. 1-29.

(Continued)

*Primary Examiner* — Le H Luu
(74) *Attorney, Agent, or Firm* — Robert C. Kowert; Kowert, Hood, Munyon, Rankin & Goetzel, P.C.

(57) ABSTRACT

Methods and apparatus for identifying features that may have a high potential impact on key application metrics. These methods rely on observational data to estimate the importance of application features, and use causal inference tools such as Double Machine Learning (double ML) or Recurrent Neural Networks (RNN) to estimate the impacts of treatment features on key metrics. These methods may allow developers to estimate the effectiveness of features without running online experiments. These methods may, for example, be used to effectively plan and prioritize online experiments. Results of the online experiments may be used to optimize key metrics of mobile applications, web applications, websites, and other web-based programs.

23 Claims, 8 Drawing Sheets

(56) References Cited

U.S. PATENT DOCUMENTS

| | | | | |
|---|---|---|---|---|
| 2010/0076818 A1* | 3/2010 | Peterson | ............... | G06Q 30/02 |
| | | | | 705/14.44 |
| 2018/0307653 A1* | 10/2018 | Bunch | ................... | G06N 20/20 |
| 2020/0202382 A1* | 6/2020 | Chen | ................. | G06Q 30/0246 |

OTHER PUBLICATIONS

Alberto Abadie, et al., "Synthetic Control Methods for Comparative Case Studies: Estimating the Effect of California's Tobacco Control Program", Aug. 2009, pp. 1-43.

Ahmed M. Alaa, et al., "Limits of Estimating Heterogeneous Treatment Effects: Guidelines for Practical Algorithm Design", Proceedings of the 35th International Conference on Machine Learning, 2018, pp. 1-10.

Susan Athey, et al., "Machine Learning Methods for Estimating Heterogeneous Casual Effects", arXiv: 1504.01132v1, Apr. 5, 2015, pp. 1-25.

Susan Athey, "The Impact of Machine Learning on Economics", The Economics of Artificial Intelligence: An Agenda (forthcoming), Jan. 2018, pp. 1-31.

Victor Chernozhukov, et al., "Double/Debiased Machine Learning for Treatment and Structural Parameters", arXiv: 1608.00060v6; Dec. 12, 2017 pp. 1-71.

Paul W. Holland, "Statistics and Causal Inference", Reprinted from 1986 American Statistical Association, Journal of the American Statistical Association, vol. 81, No. 396, Dec. 1986, pp. 945-970.

Scott Powers, et al,. "Some methods for heterogeneous treatment effect estimation in high-dimensions", arXiv: 1707.001021, July 1, 2017. pp. 1-28.

Paul R. Rosenbaum, et al., "The central role of the propensity score in observational studies for casual effects", Biometrika, 70, 1. 1983, pp. 41-55.

Donald B. Rubin, "Estimating Causal Effects of Treatments in Randomized and Nonrandomized Studies", Journal of Educational Psychology, vol. 66, No. 5, 1974, pp. 688-701.

Donald B. Rubin, "Causal Inference Using Potential Outcomes: Design, Modeling, Decisions", Journal of the American Statistical Association, Mar. 2005, pp. 322-331.

Soren R. Kunzel, et al., Metalearners for estimating heterogeneous treatment effects using machine learning,www.pnas.org/cgi/doi/10.1073/pnas.1804597116, Mar. 5, 2019, vol. 116, No. 10, pp. 4156-4165.

Elizabeth A. Stuart, "Matching Methods for Causal Inference: A Review and a Look Forward", Statistical Science, vol. 25, No. 1, 2010, pp. 1-21.

* cited by examiner

CAUSAL ANALYSIS SYSTEM

BACKGROUND

Developers of mobile applications, web applications, websites, and other web-based programs may desire to optimize key metrics such as operations, user engagement, etc. Conventionally, optimization involves running online experiments (e.g., A/B experiments), analyzing the results, and adjusting the user interface accordingly. However, many of these experiments turn out to have little or no impact on the key metrics. As an example, a web application development team may be interested in determining the importance of different features of the mobile application with respect to user engagement. Conventionally, the team may run online experiments where certain features are made more prominent on the user interface to estimate their importance to the key metrics. However, the web application may have many features, and the experiments often do not produce the desired results. Thus, it is desirable to have a method for prioritizing which features of the mobile application to test so that the team can effectively plan and prioritize online experiments.

An A/B experiment is a randomized experiment with two variants, A and B. A/B testing includes application of statistical hypothesis testing or "two-sample hypothesis testing." A/B testing provides a way to compare two versions of a single variable, typically by testing a subject's response to variant A against variant B, and determining which of the two variants is more effective.

Double/Debiased Machine Learning (double ML) is a machine learning method that relies on estimating primary and auxiliary predictive models. Double ML forms an orthogonal score for a target low-dimensional parameter by combining auxiliary and main ML predictions. The score is then used to build a de-biased estimator of the target parameter which typically will converge at the fastest possible rate and be approximately unbiased and normal, and from which valid confidence intervals for the parameters of interest may be constructed.

A recurrent neural network (RNN) is a class of artificial neural networks where connections between nodes form a directed graph along a temporal sequence. This allows it to exhibit temporal dynamic behavior.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for identifying features that may have a high potential impact on key web-based application metrics. These methods rely on observational (non-experimental) data to estimate the importance of web-based application features, and use causal inference tools such as Double Machine Learning (double ML) or recurrent neural networks (RNN) to estimate the impacts of the treatment features on key metrics. These methods may, for example, be used to effectively plan and prioritize online experiments (e.g., A/B experiments). Results of the online experiments may be used to optimize key metrics, including but not limited to user engagement, of mobile applications, web applications, websites, and other web-based programs. Embodiments of the methods described herein may allow application developers to estimate the effectiveness of application features without running A/B experiments. This may help in making the experimentation framework more efficient as fewer experiments with larger sample sizes may be run, and may also improve decision making.

Developers of web-based applications typically conduct randomized experiments (A/B tests) either online or offline to test the effectiveness of certain features and to optimize customer experiences or other metrics. This experimental approach provides accurate estimates and does not require much technical expertise. However, experiments (A/B tests) take time to complete, and do not apply for all features or widgets. Furthermore, to coordinate the testing schedule and design solid experiments takes substantial planning time.

Embodiments may apply a causal ML model to identify lifts of various features using observational data. Embodiments may thus estimate the effect of features on target metrics of an application without running experiments (e.g., A/B tests). Results of the causal ML model may then be used to plan and prioritize testing (e.g., A/B tests). The model can be validated using ad-hoc experiments to establish accuracy before applying to different contexts. Once trained, a development team can use the model estimates (which may be refreshed using most recent data) and test results to continuously make decisions on feature launches, to optimize efforts among multiple metrics, etc.

In some embodiments, a Double Machine Learning (double ML) model may be used to estimate the effects of treatment features on target metrics. Alternatively, in some embodiments, a recurrent neural networks (RNN) model may be used.

A challenge in using a causal ML model is in selecting the treatment features. Conventionally, these features are selected based on domain knowledge. Embodiments may use a data-based approach that uses an ML model for selecting the treatment features. This helps to make the approach highly scalable and applicable to any application feature.

Embodiments may be used to identify features that may have a high potential impact on key web-based application or website metrics. These identified features may, for example, be used in improving a website's or application's user interface (UI) to optimize one or more goals of the website or application (e.g., to increase user engagement with the website or application).

Embodiments may help application or website development teams when designing and modifying aspects of websites or applications. For example, a development team may identify a target metric that they want to improve for an aspect, and identify one or more categories as possible treatments. A causal inference engine, system, or service as described herein may provide a prioritization of which categories within the aspect of the website or application are more influential towards the target metric.

Embodiments may also aid in allocating resources (investments, hardware/software, network bandwidth, data usage/storage, etc.) for applications or websites. Embodiments may be used to improve the overall efficiency of a computer-based application or process.

Embodiments may generate results (e.g., prioritized treatment features) for segments or categories of users. The generated results may be fed into other models to personalize the experience for individual users, e.g. by presenting a personalized user interface to each user. Thus, at the finest granularity, the segments or categories of users may be individual users.

The results of the observational techniques as described herein may be used as prior knowledge to experimental methods or to collected real-time data. Based on the prior knowledge, inferences can be drawn from the experimental or real-time data. Combining the prior knowledge with the experimental or real-time data may provide more advanced knowledge that may, for example, be used in decision making for an application or website.

For illustrative purposes, an analysis of identifying features that may have a high potential impact on a user engagement metric or application visit days metric with a mobile application is provided. Note that the methods described herein are generic, and can be used to analyze other metrics and applied to websites and other web-based programs.

Figure 1:
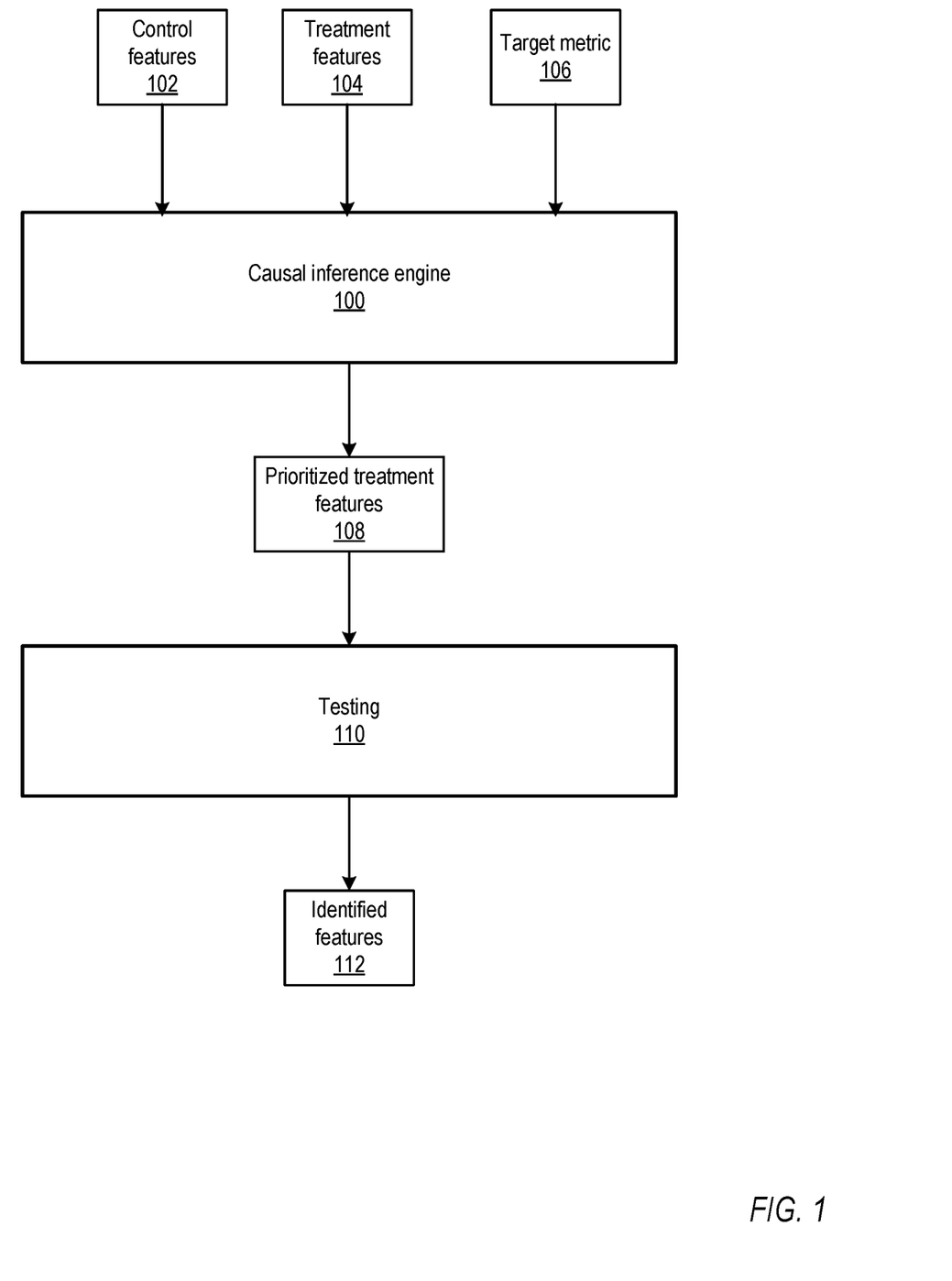
FIG. 1 is a block diagram that broadly illustrates a causal analysis system, according to some embodiments.
Figure 8:
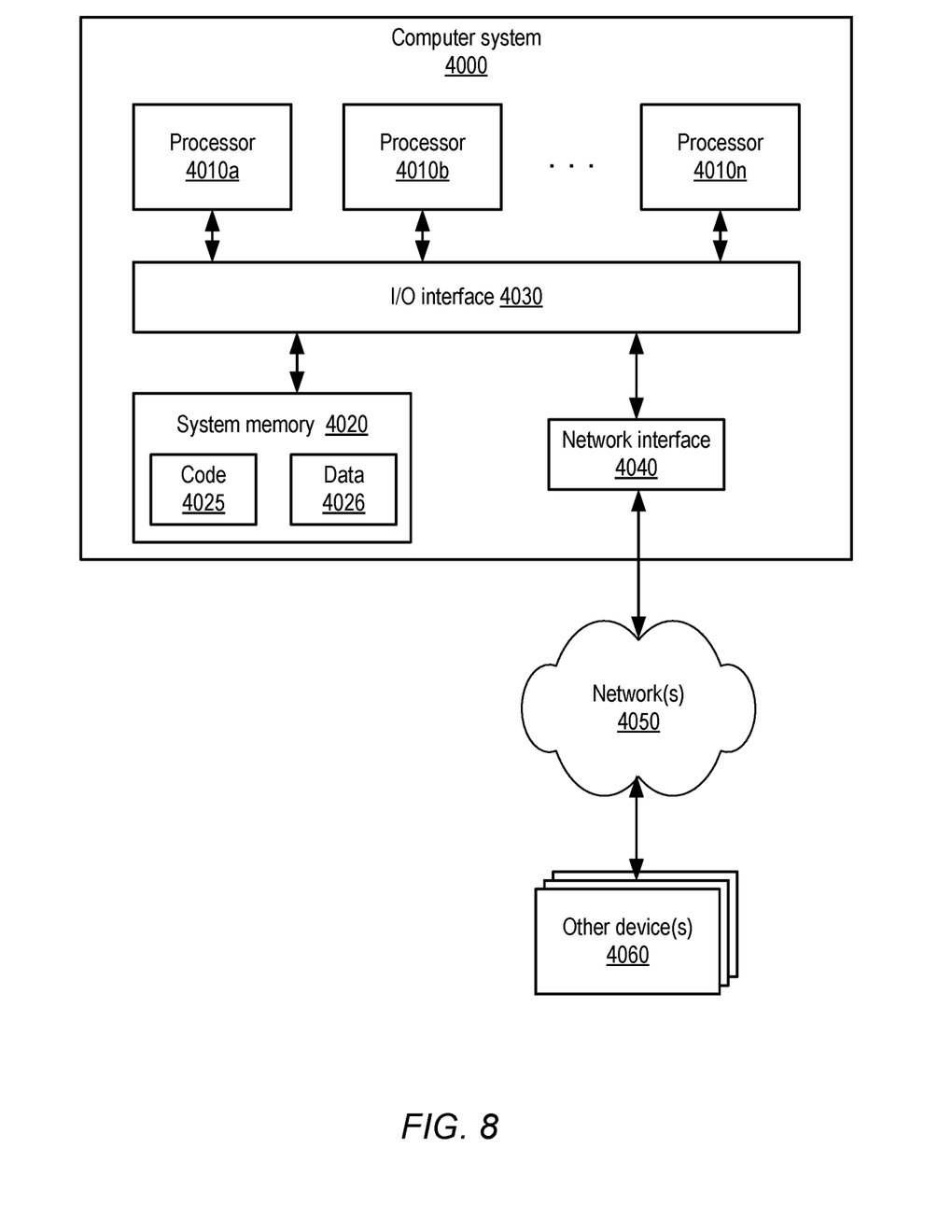
FIG. 8 is a block diagram illustrating an example computer system that may be used in some embodiments.

FIG. 1 is a block diagram that broadly illustrates a causal analysis system, according to some embodiments. A causal inference engine 100 implements a machine learning (ML) model, for example a double ML or RNN model. The ML model may be trained with data for a particular website or application. The causal inference engine 100 may be implemented by or on one or more computer systems, for example as illustrated in FIG. 8.

Inputs to the causal inference engine 100 may include, but are not limited to, control features 102, treatment features 104, and a target metric 106 (e.g., future mobile application visit days). Treatment features 104 include one or more features of the mobile application that are of interest in regard to the target metric 106, and may be specified by the double ML development team. Control features 102 are additional features that include, but are not limited to, information about user behavior over a prior period of time (e.g., past usage of application features, historical application visit days, etc.), and are not present in the treatment features 104.

Figure 2:
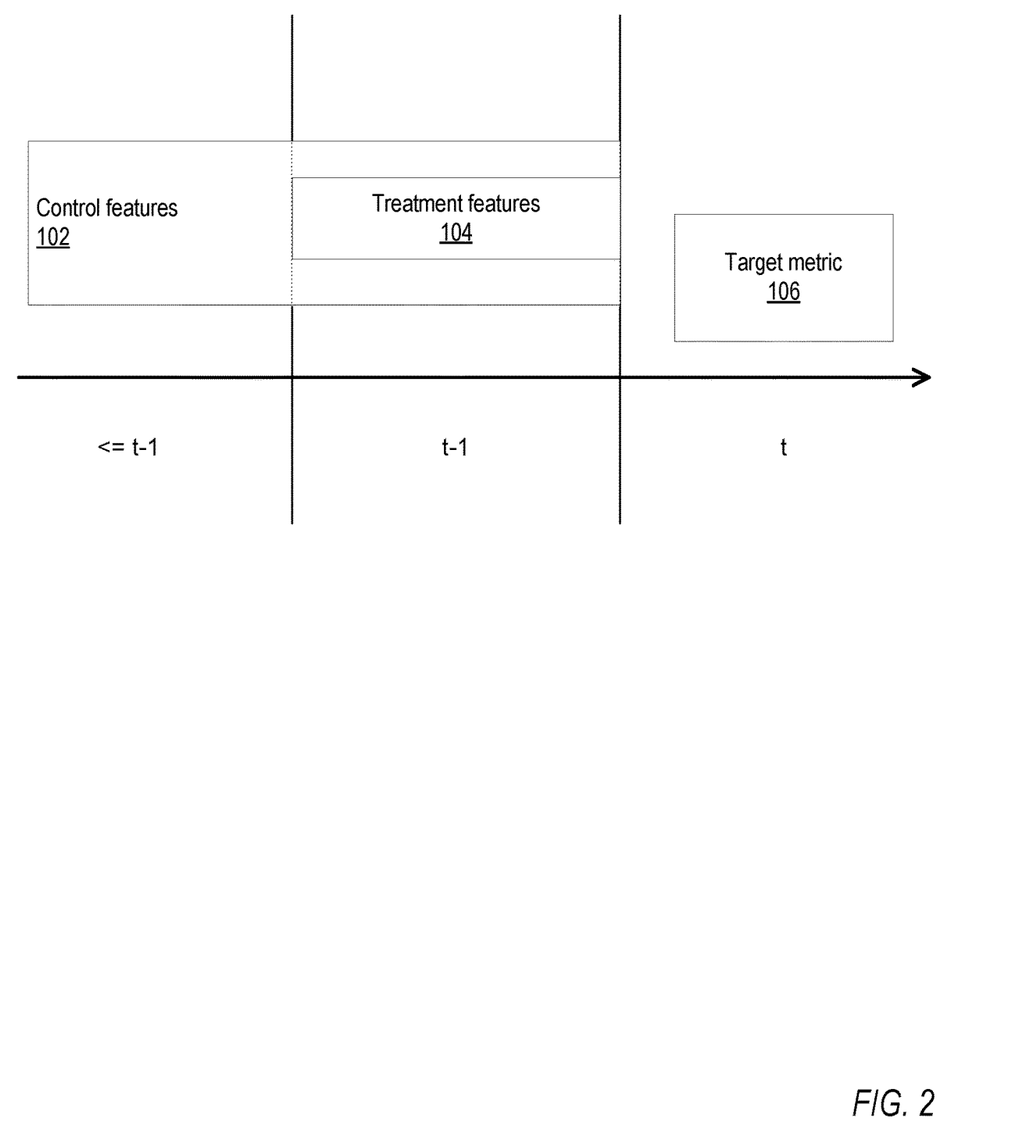
FIG. 2 graphically illustrates a time series for the causal analysis of a target metric, according to some embodiments.

FIG. 2 graphically illustrates a time series for the causal analysis of a target metric 106 (e.g., mobile application visit days) in (future) time period t. Control and treatment feature data input to the causal analysis system for analysis may, for example, include clickstream data collected as the users use the mobile application. Control features 102 are analyzed for a time period (<=t-1), which may be a week, a month, six months, etc., and may also be analyzed for time period t-1 (referred to as the treatment period). Treatment features 104 are analyzed for time period t-1, and may also be analyzed for time period <=t-1 (referred to as the historical period). The treatment period (t-1) may be a week, two weeks, a month, etc. For a particular treatment feature A, there may be some version of A in the control features that is analyzed using data prior to the treatment period. The causal analysis system isolates the effect of treatment feature A during the treatment period. However, there may be at least some overlap of features between the control and treatment features. Thus, treatment feature A may be analyzed during the treatment period, but also prior to the treatment period. In addition, one or more control features which are not treatment features may be analyzed in the treatment period.

Referring again to FIG. 1, if the set of treatment features 104 is large, a ML-based feature selection technique (e.g., using a lasso regression technique) may be used with respect to a target metric (e.g., future mobile app visit days), for example as shown below:

$y_{it}$=mobile app visit days for customer $i$ in month $t$ $x_{it}^k$=Usage of App feature $k$ for customer $i$ in month $t$ $y_{it} = \alpha + \Sigma_k \beta_k x_{i(t-1)}^k + \epsilon_{it}$ Feature selection may, for example, be performed when there are many features; some of the features may be correlated, and feature selection may be used to limit or reduce the number of correlated features. In addition, some features may be more strongly correlated with the target metric than others, and one or more features that are less strongly correlated with the target metric may be dropped. While feature selection is described herein in relation to limiting the number of treatment features, feature selection may also be performed for control features.

Feature selection may also be done for a user segment. Different user segments may be defined. For example, five segments may be defined, with state 0 being users who historically have not engaged with the applications much, state 4 being highly engaged customers, and states 1-3 being those users that are in between at different levels of engagement. The time period t for the target may be arbitrarily chosen.

Output of the causal inference engine 100 includes treatment features 108 prioritized with respect to estimated impact on the target metric 106. An example of prioritized treatment features 108 is illustrated later in this document. The prioritized treatment features 108 may be used to prioritize testing 110 (e.g., A/B testing) of the mobile application. Testing 110 may identify one or more features 112 of the application that may be modified or enhanced to provide a desired effect on the target metric 106 (e.g., to increase mobile application visit days for users in general or for specific segment(s) of users).

Figure 3:
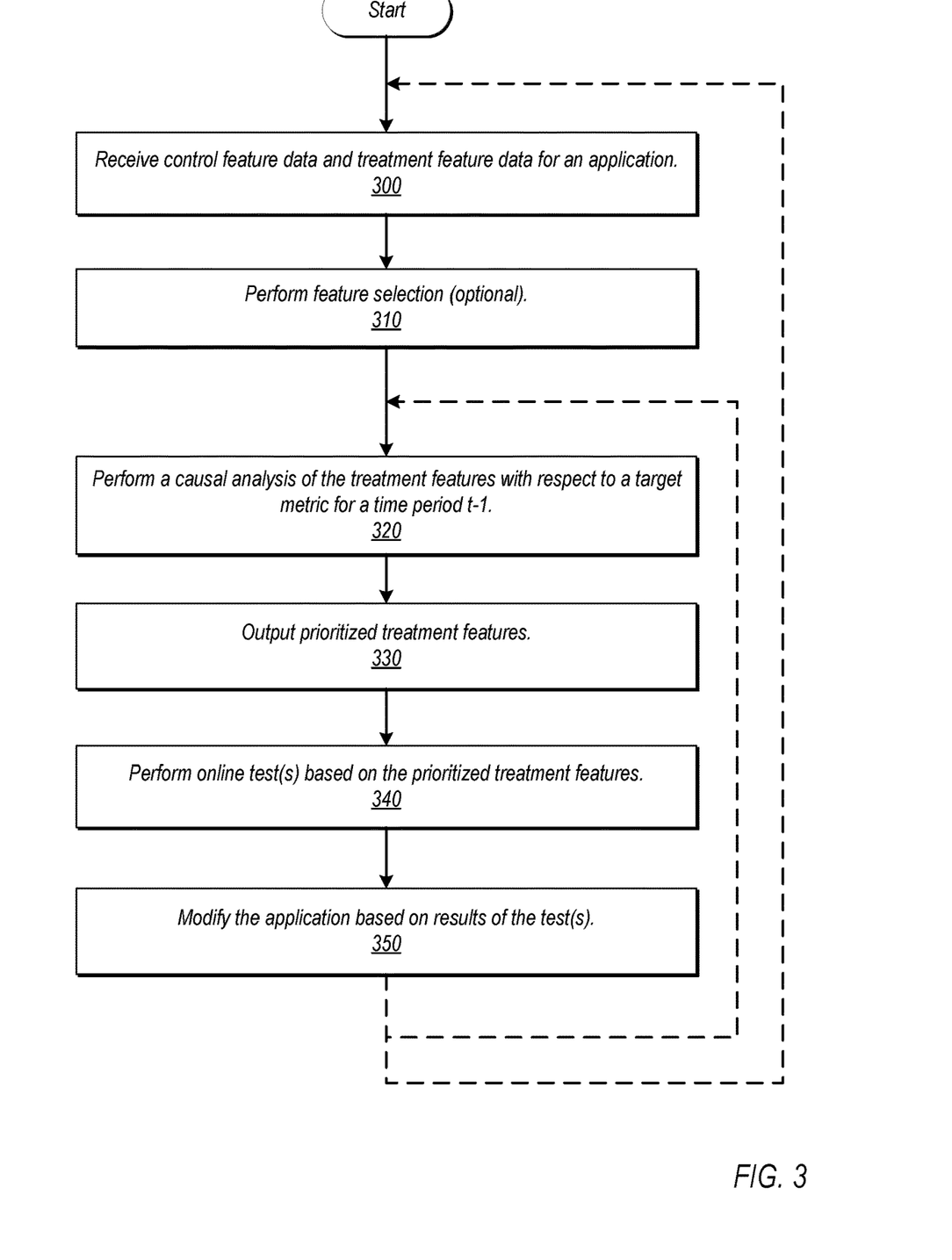
FIG. 3 is a high-level flowchart of a causal analysis method, according to some embodiments.

FIG. 3 is a high-level flowchart of a causal analysis method, according to some embodiments. A machine learning (ML) model, for example a double ML or RNN model, may be trained with data for a particular application. As indicated at 300, control feature data for a historical time period and treatment feature data for a treatment time period t–1 may be obtained. As noted in reference to FIG. 2, the control features may include versions of one or more of the treatment features, and one or more of the control features that are not treatment features may extend into the treatment period. As indicated at 310, optionally, feature selection may be performed on the treatment features. In some cases, feature selection may be done for one or more segments or categories of users. As indicated at 320, the feature data are input to the ML model to perform causal analysis of the treatment features with respect to a target metric for treatment time period t–1 to generate prioritized treatment features with respect to estimated impact on the target metric. As indicated at 330, prioritized treatment features are output, for example to an application testing process. As indicated at 340, one or more tests (e.g., online tests such as A/B experiments) may be planned, prioritized, and performed based on the prioritized treatment features. The tests may, for example, be used to determine one or more of the treatment features that have a higher impact on the target metric than the other treatment features. In some embodiments, the online tests may be used to determine one or more of the treatment features that have an impact on the target metric that is above (or, alternatively, below) a specified threshold. As indicated at 350, the application may be modified based on results of the tests. As indicated by the dashed arrow returning to element 320, causal analysis of treatment features to output and test prioritized treatment features may be repeated one or more times for additional treatment time periods t–1. As indicated by the dashed arrow returning to element 300, the entire method may also be repeated one or more times for an application.

Embodiments may provide a ranking of features that may, for example, be used to simplify user interfaces for websites or mobile applications, and in business metric reporting. Embodiments may help application or website developers to estimate the most valuable features based on their effect on metrics such as user engagement. The developers can then optimize their interfaces based on these insights. Embodiments may allow developers to estimate the value of particular features using observational data without running conventional online experiments (e.g., A/B testing). The estimated values of the features may then be used to plan and prioritize further testing.

Double ML Methods

As mentioned above, causal inference engine 100 may implement a machine learning (ML) model, for example a double ML model. In the presence of high-dimensional nuisance parameters, though well-suited for prediction, naïve ML estimation of counterfactuals may result in bias in estimation of treatment effect due to regularization and overfitting. The double ML approach tackles this using Neyman-orthogonal moments and cross-fitting with sample split. The double ML estimator of treatment effect is approximately unbiased and normally distributed, which allows for construction of valid inference (i.e. confidence interval).

Double ML is flexible as many ML methods may be used for estimating the nuisance parameters, such as random forests, lasso, ridge, deep neural nets, and various hybrids and ensembles of these methods. Double ML is also flexible in the treatment variable, and can extend to applications with continuous treatment or multiple treatment.

Figure 4:
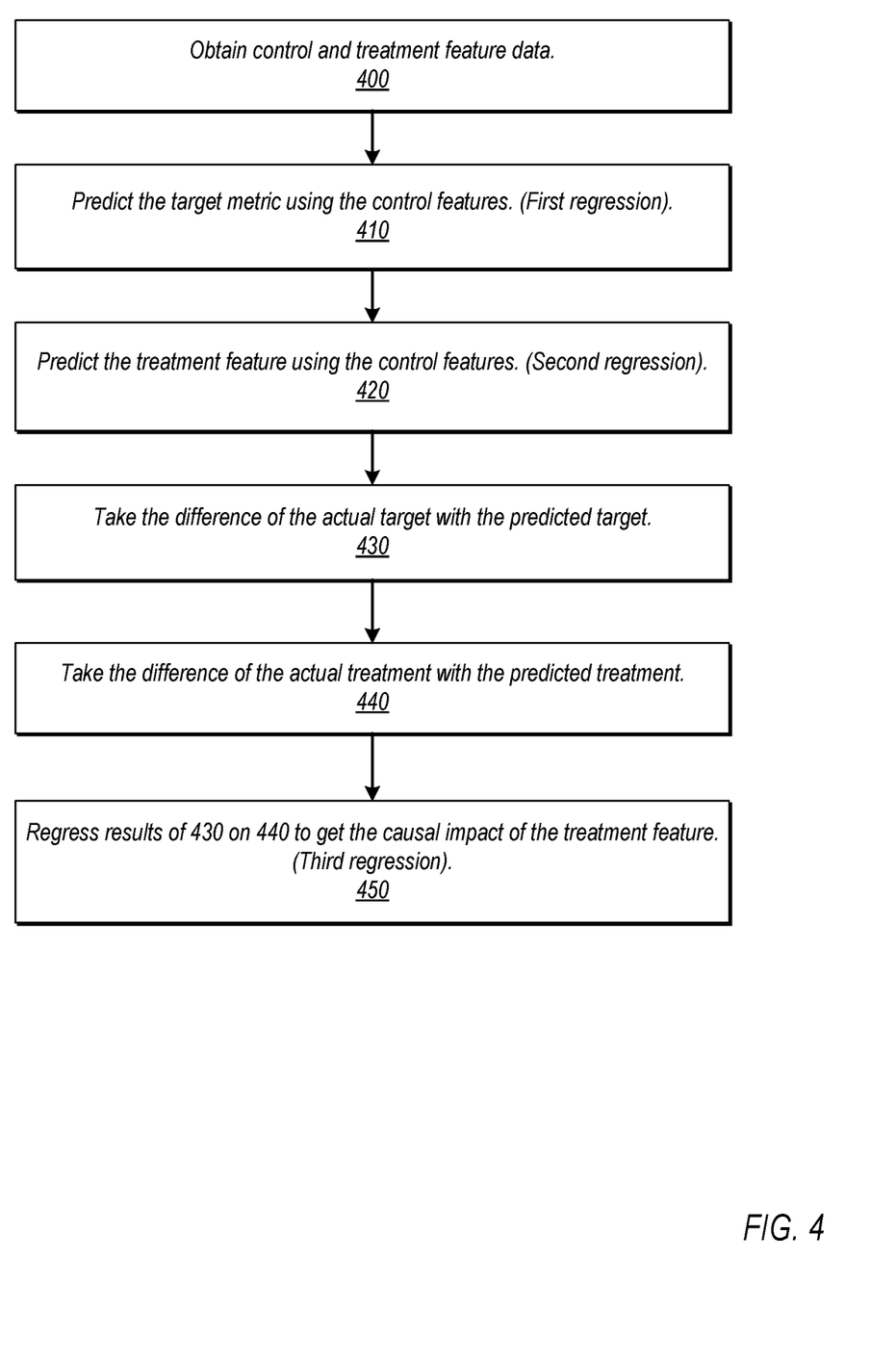
FIG. 4 is a high-level flowchart of a regression model using Double/Debiased Machine Learning (double ML) to determine the causal impact of a treatment feature on a target metric, according to some embodiments.

FIG. 4 is a high-level flowchart of a regression model using double ML to determine the causal impact of a treatment feature on a target metric, according to some embodiments. As indicated at 400, control and treatment feature data are obtained. As indicated at 410, the target metric is predicted using the control features (a first regression). As indicated at 420, the treatment feature is predicted using the control features (a second regression). As indicated at 430, the difference between the actual target and the predicted target is determined. As indicated at 440, the difference between the actual treatment and the predicted treatment is obtained. As indicated at 450, a third regression is performed on results of 430 on 440 to get the causal impact of the treatment feature.

The following more formally describes the above method. Let Y denote the metric of interest (e.g. future engagement action counts), D denote the treatment (can be a vector), and X denote the set of features (high dimensional). Consider the simple partial linear regression model:

$$Y = D\theta_o + g_0(X) + U, E[U|X,D] = 0$$

$$D = m_0(X) + V, E[V|X] = 0$$

$\theta_o$ captures the true causal impact of D. The double ML procedure works as follows:

Predict Y and D using X by $\widehat{E[Y|X]}$ and $\widehat{E[D|X]}$ (using any ML tools) using subset of data.

Residualize $\hat{W} = Y - \widehat{E[Y|X]}$ and $\hat{V} = D - \widehat{E[D|X]}$ on the rest of the sample.

Regress $\hat{W}$ on $\hat{V}$ to get $\hat{\theta_o}$.

In an example use case, a separate model is developed for each treatment feature in consideration to find out the causal impact of that feature on a target metric (e.g., future mobile application engagement), controlling for past activities (control features). This may be performed separately for each of several user segments (states 0-5).

Table 1 shows an example list of prioritized treatment features (features 1-10) for several user segments (states 0-4) output by a double ML model for unit increase in usage of these features with regard to a target metric (e.g., mobile application visit days in the next month).

TABLE 1

|  | State 0 | State 1 | State 2 | State 3 | State 4 |
| --- | --- | --- | --- | --- | --- |
| Feature 1 | 0.27 | 0.41 | 0.40 | 0.41 | 0.39 |
| Feature 2 | 0.94 | 0.48 | 0.26 | 0.39 | 0.34 |
| Feature 3 | 0.90 | 0.45 | 0.35 | 0.35 | 0.37 |
| Feature 4 | 1.06 | 0.66 | 0.50 | 0.55 | 0.50 |
| Feature 5 | 0.19 | 0.40 | 0.46 | 0.50 | 0.43 |
| Feature 6 | 1.83 | 0.94 | 0.77 | 0.80 | 0.66 |
| Feature 7 | 0.15 | 0.46 | 0.42 | 0.39 | 0.32 |
| Feature 8 | 0.08 | 0.15 | 0.09 | 0.16 | 0.28 |
| Feature 9 | 0.56 | 0.67 | 0.64 | 0.54 | 0.53 |
| Feature 10 | 0.29 | 0.56 | 0.51 | 0.48 | 0.42 |

Table 2 shows the global lift of the features, i.e. the % decrease in the target metric (e.g., mobile application visit days in the next month), if the feature is not used at all.

TABLE 2

|  | State 0 | State 1 | State 2 | State 3 | State 4 |
| --- | --- | --- | --- | --- | --- |
| Feature 1 | 1.57% | 5.43% | 8.59% | 12.11% | 13.92% |
| Feature 2 | 0.02% | 0.04% | 0.03% | 0.06% | 0.06% |
| Feature 3 | 2.32% | 8.50% | 11.19% | 14.49% | 16.70% |

TABLE 2-continued

|  | State 0 | State 1 | State 2 | State 3 | State 4 |
|---|---|---|---|---|---|
| Feature 4 | 0.38% | 0.87% | 1.04% | 1.56% | 1.92% |
| Feature 5 | 0.77% | 0.56% | 0.47% | 0.47% | 0.42% |
| Feature 6 | 0.04% | 0.14% | 0.25% | 0.43% | 0.55% |
| Feature 7 | 0.07% | 0.26% | 0.41% | 0.61% | 0.78% |
| Feature 8 | 0.08% | 0.05% | 0.02% | 0.03% | 0.05% |
| Feature 9 | 0.26% | 0.13% | 0.05% | 0.02% | 0.01% |
| Feature 10 | 109.14% | 0.05% | 0.08% | 0.10% | 0.10% |

Note that, in terms of local lift, features 2 and 4 usage have lower impact for higher engaged users (state 4). Features 5 and 10 usage have higher impact on higher engaged users. These insights on global and local lift may be used to prioritize (e.g., should the experiment be run for high of low engaged segments?) and plan experiments (e.g., how long should the experiment run, what is the optimal number of treatment and control users, etc.?).

Uplift-Based Method Using Recurrent Neural Networks (RNNs)

As mentioned above, causal inference engine 100 may implement a machine learning (ML) model, for example a Recurrent Neural Network (RNN) model. This approach may be based on a causal inference algorithm, for example the Single Model Estimator (SME) framework, and utilizes a sequence-to-sequence Recurrent Neural Network (RNN) architecture. The sequence-to-sequence Recurrent Neural Network (RNN) architecture may be used to predict desired outcome(s), based on available features, and then two sets of predictions may be made: once with all features unaltered and once after 'zeroing-out' the treatment features. The sequence-to-sequence RNN approach may "featurize" each user's history in a time-ordered, step-wise fashion and then makes predictions for each of the steps.

A sequence-to-sequence RNN models the time-series of both control and treatment features. Different from double ML, the RNN model learns a latent state representation for a user at time 't'. A motivation behind using sequence-to-sequence RNNs for incremental estimation emerges from the way the algorithm actually learns the various feature interactions. In a simplistic explanation, this formulation resembles an elaborate Hidden Markov Model. More specifically, the RNN cells are the same for all the different steps, which means that the RNN learns how to adapt its hidden state/representation after including the information of one additional step, conditional on the state/representation formed up until that step. This mechanism may be suitable to deduce the incremental effects of features for longitudinal data, compared to the traditional, non-sequential ML algorithms. Moreover, the RNN framework may be more efficient when compared to non-sequential algorithms, in terms of training data size and associated time costs when it comes to longitudinal data.

Given the time series for control and treatment features as illustrated in FIG. 2, an RNN model can be applied to estimate effects of treatments on target metrics. The control features may be viewed as a time series, and can be organized in time periods, e.g. monthly or weekly. As an example, for every user, looking at a monthly aggregation, there is a time series of N months of different control features. The treatments are also a time series; so, for example, there may be twelve months of controls, and one month of treatments. The target metric (t) may, for example, be the next month or three months of activity. With the data so organized, an RNN model can be applied to the data set instead of or in addition to a double ML model to predict desired outcome(s) based on available features, and then two sets of predictions may be made: once with all features unaltered and once after 'zeroing-out' the treatment feature(s). In some embodiments, results of the two models (double ML and RNN) may be generated and compared.

A first step in this method is to train an RNN model. For every user, a history of control and treatment features is gathered over a given period of time, and then the RNN model is trained using the control and treatment features to make predictions at each step. In the architecture, each 'row' of data is two-dimensional (S×F), where S is the maximum number of RNN steps included in the model, and F is the feature dimension for each RNN step. Once the RNN model is trained, inference is performed, for example based on the single model estimator (SME) framework. SME is a causal inference algorithm in which lift calculation corresponds to feature importance. To assess the effects of a specific treatment, two sets of predictions are made, once with all features unaltered and once after 'zeroing-out' the feature corresponding to this specific treatment. The difference in outputs (properly normalized) gives the conditional treatment effects. Note that other causal inference algorithms may be used in some embodiments.

Figure 5:
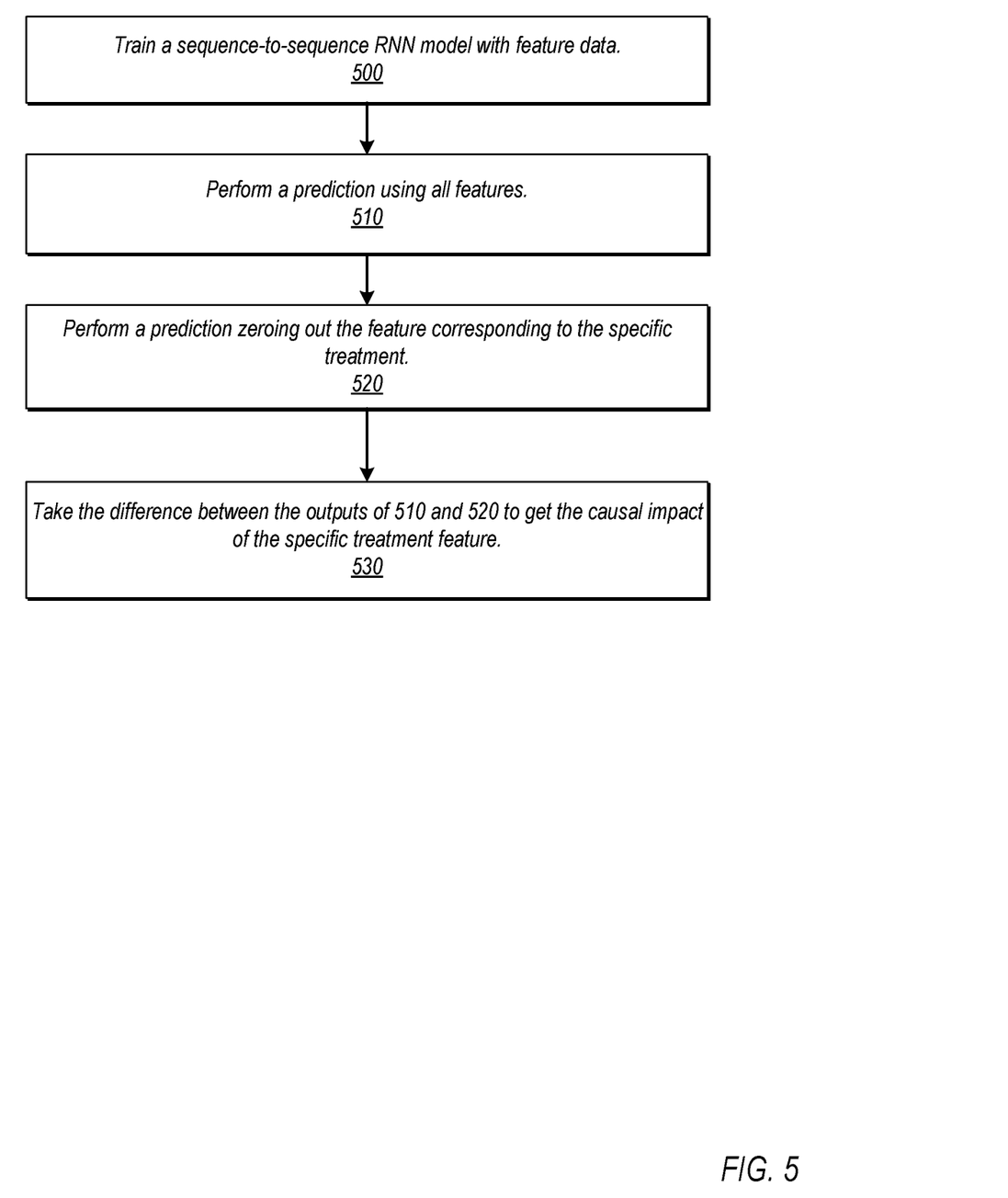
FIG. 5 is a high-level flowchart of using a recurrent neural network (RNN) model to determine the causal impact of a treatment feature on a target metric, according to some embodiments.

FIG. 5 is a high-level flowchart of using a sequence-to-sequence recurrent neural network (RNN) model to determine the causal impact of a treatment feature on a target metric, according to some embodiments. As indicated at 500, an RNN model is trained with feature data. As indicated at 510, a prediction is performed using all features. As indicated at 520, a prediction is performed, zeroing out the feature corresponding to the treatment. As indicated at 530, the difference between the outputs of the two predictions gives the causal impact of the treatment feature.

The following more formally describes the above method. A problem to be solved is estimating heterogeneous (individualized) causal effects of a treatment from observational data. The following discussion relies on a Rubin-Neyman potential outcomes framework to discuss the basic notions and models of causal inference. Consider an observational dataset with a population of subjects, where each subject i=1, . . . , N is endowed with a d-dimensional feature vector $X_i \in \mathbb{R}^d$. A treatment assignment indicator $W_i \in \{0,1\}$ is associated with each subject i; $W_i=1$ if the treatment under study was applied to subject i, and $W_i=0$ otherwise. Subject i's responses with and without the treatment (the potential outcomes) are denoted as Y(1) and Y(0), respectively. Treatments are assigned to subjects according to an underlying policy that depends on the subjects' features. This dependence is quantified via the conditional distribution:

$$p(x)=P(W_i=1|X_i=x)$$

also known as the conditional probability of treatment assignment or the propensity score of subject i. The response $Y(W_i)$ is the 'factual outcome' which is observed in the data, whereas $Y(1-W_i)$ denotes the hypothetical, unrealized 'counterfactual outcome' that cannot be observed; this is the 'fundamental problem of causal inference'. An observational dataset $D_n$ comprises N samples of the form:

$$D_n=\{X_i,W_i,Y(W_i)\}_{i=1}^N$$

The causal effect of the treatment on subject i with a features $X_i=x$ is characterized through the 'Conditional Average Treatment Effect' (CATE) function T(x), which is defined as the expected difference between the two potential outcomes:

$$\text{CATE: } \tau(x)=E[Y_i(1)-Y_i(0)|X_i=x].$$

The incremental effects of a treatment are quantified via the population average treatment effect, defined simply as $E[\tau(X_i)]$. Hence, a goal is to build reliable estimators of $\tau(x)$ using samples from observational data of the form $D_N$. Towards this goal, two assumptions for causal identifiability and consistency may be used: unconfoundedness and overlap. Unconfoundedness requires that treatment and potential outcomes are independent conditional on observables, i.e., $(Y(0), Y(1)) \perp W_i | X_i$. Overlap requires a positive probability of receiving treatment for all values of the observables, i.e., $0 < p(x) < 1$. The combination of unconfoundedness and overlap assumptions are commonly referred to as strong ignorability.

In some embodiments, the single model estimator (SME) framework may be used to estimate CATE under the strong ignorability assumption. In the SME framework, the conditional expectation:

$$\mu(w,x) = E[Y_i^{obs} | W_i = w, X_i = x]$$

is estimated with the observed outcome $Y_i^{obs}$ as the target and both the treatment $W_i$ and $X_i$ as the features, using an ML method (e.g., RNN). Given the estimate:

$$\hat{\mu}(w,x) = E[Y_i^{obs} | W_i = w, X_i = x]$$

the CATE is estimated as:

$$\tau^{SME}(x) = \hat{\mu}(1,x) - \hat{\mu}(0,x).$$

In other words, a single ML model (e.g., an RNN model) is trained to predict the outcome Y, based on the features $W_i$ and $X_i$, and then two sets of predictions are made: once with all features unaltered and once after 'zeroing-out' the treatment feature.

Continuous Feature Effect Monitoring

The above describes methods for identifying features that may have a high potential impact on key web-based application metrics that rely on observational (non-experimental) data to estimate the importance of web-based application features, and that use causal inference tools such as Double Machine Learning (double ML) or recurrent neural networks (RNN) to estimate the impacts of the treatment features on key metrics. However, embodiments of the causal inference engine may be adapted for other uses. For example, embodiments may be used to periodically or continuously monitor effects of selected features on target metrics over time by obtaining additional feature data and performing causal analysis to estimate the ongoing effects of one or more treatment features on one or more target metrics. For example, in some embodiments, if an effect of a particular feature or features on a particular metric or metrics is detected as going above or below a specified threshold for a specified period of time, an alert or alarm may be issued, or some other action may be initiated. As another example, the continuously monitored effects of various features on one or more metrics may be used to detect a root cause (e.g., a particular feature) of a particular effect on a particular metric.

Example Environments

Figure 6:
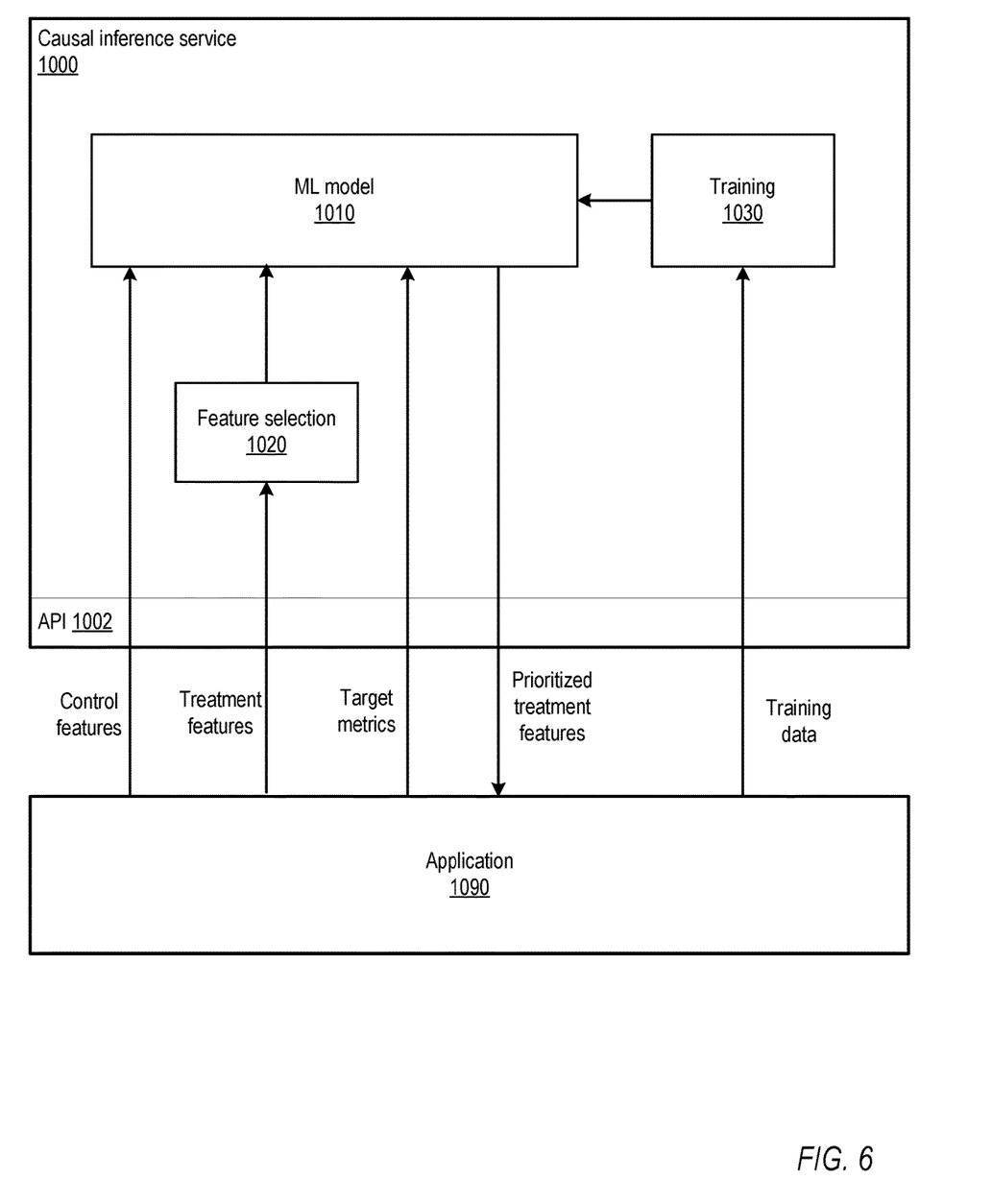
FIG. 6 illustrates a causal inference service, according to some embodiments.

FIG. 6 illustrates a causal inference service 1000, according to some embodiments. The causal inference service 1000 may, for example, be implemented by one or more computer systems as illustrated in FIG. 8. The causal inference service 1000 may implement a machine learning (ML) model 1010, for example a double ML or RNN model. The ML model 1010 may be trained 1030 with data (e.g., control features, treatment features, and target metrics) for a particular web-site or application. The causal inference service 1000 may be implemented by or on one or more computer systems, for example as illustrated in FIG. 8.

The causal inference service 1000 may be accessed from an application 1090 via an API 1002 to provide training data (e.g., data sets of control features, treatment features, and target metrics) for training an ML model 1010, to specify controls, treatments, and target metric(s), and to provide control feature data for and treatment feature data to be analyzed by the trained ML model 1010. In some embodiments, causal inference service 1000 may be accessed from an application 1090 via an API 1002 to select a particular type of ML model (e.g., a double ML model or an RNN model) that is to be used. In some embodiments, feature selection 1020 as described herein may be performed on the input treatment features prior to the analysis. The causal inference service 1000 may perform causal analysis on the inputs using the trained ML model 1010 to generate and output prioritized treatment features as described herein. The prioritized treatment features may, for example, be used to plan and prioritize online tests (e.g., A/B experiments) for the application 1090.

Figure 7:
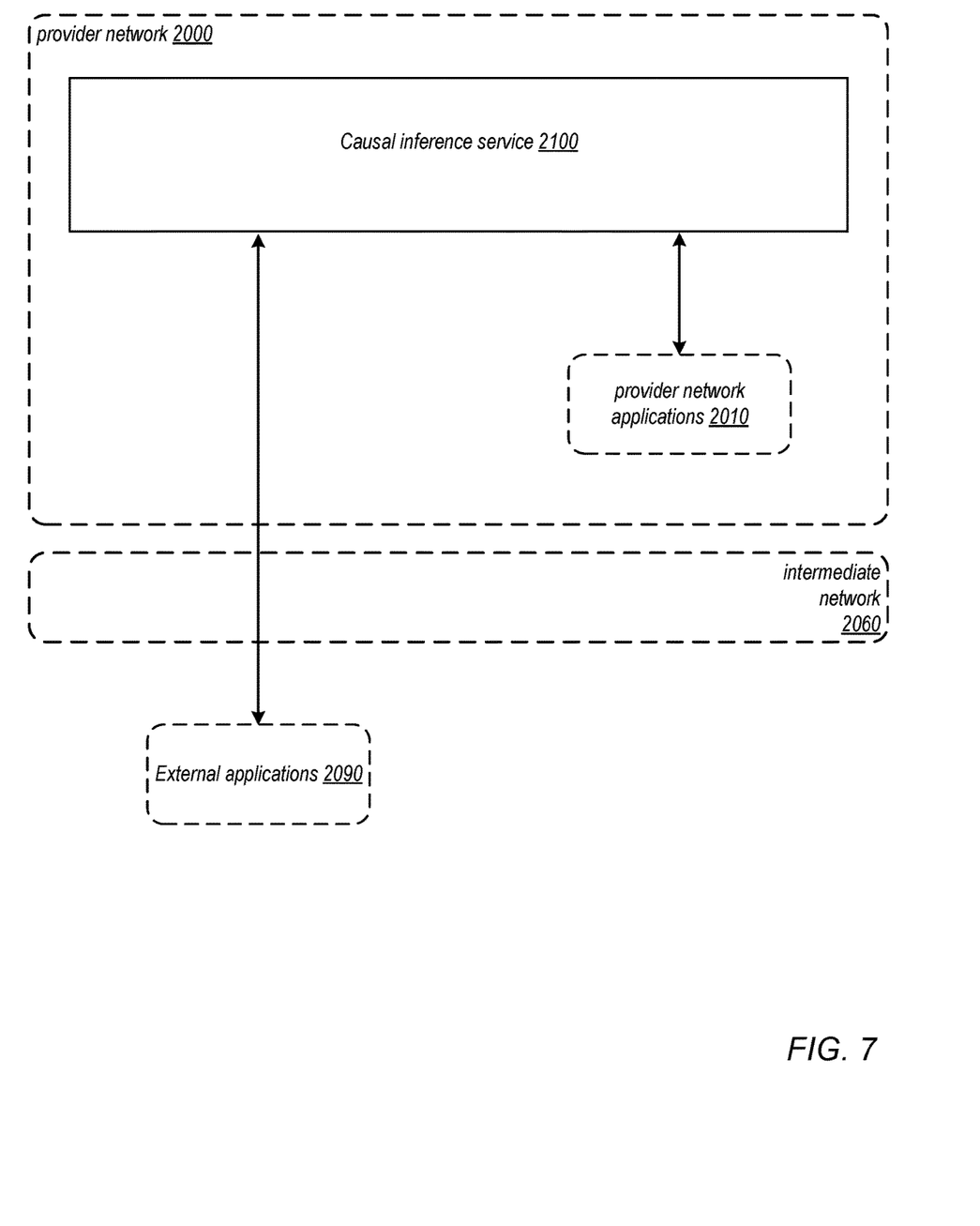
FIG. 7 illustrates a causal inference service implemented on a provider network, according to some embodiments.

FIG. 7 illustrates a causal inference service 2100 implemented on a provider network, according to some embodiments. Embodiments of a causal inference service 2100 as illustrated in FIG. 6 may be implemented in the context of a service provider that provides virtualized resources (e.g., virtualized computing resources, virtualized storage resources, virtualized database (DB) resources, etc.) on a provider network 2000 to clients of the service provider. Virtualized resource instances may be provisioned via one or more provider network services, and may be rented or leased to the clients of the service. At least some of the resource instances on the provider network 2000 (e.g., computing resources) may be implemented according to hardware virtualization technology that enables multiple operating systems to run concurrently on a host computer, i.e. as virtual machines (VMs) on the host.

The provider network 2000, via the provider network services, may enable the provisioning of logically isolated sections of the provider network 2000 to particular clients as client private networks on the provider network 2000. At least some of a client's resources instances on the provider network 2000 may be provisioned in the client's private network. The provider network 2000, via the services, may provide flexible provisioning of resource instances to clients in which virtualized resource instances can be automatically added to or removed from a client's configuration on the provider network 2000 in response to changes in demand or usage, thus enabling a client's implementation on the provider network 2000 to automatically scale to handle computation and/or storage needs.

Provider network services may include one or more of, but are not limited to, one or more hardware virtualization services for provisioning computing resource, one or more storage virtualization services for provisioning storage resources, and one or more database (DB) services for provisioning DB resources. In some implementations, a client may access one or more of these services via respective APIs to provision and manage respective resource instances in respective private networks. However, in some implementations, a client may instead access another service via an API to the service; the other service may then interact with one or more of the other services on behalf of the client to provision resource instances.

In some embodiments, the service provider may provide a causal inference service 2100 to clients of provider network 2000. Causal inference service 2100 may provide one or more APIs via which applications 2010 implemented on the provider network 2000 or external applications 2090 may access the causal inference service 2100 as described in reference to FIGS. 1 through 6.

In some embodiments, the causal inference service 2100 may be accessed from an application 2010 or 2090 via an API 1002 to provide training data, to specify controls, treatments, and target metric(s), and to provide control feature data for a specified period and treatment feature data for a specified period. In some embodiments, causal inference service 2100 may be accessed to select a particular type of ML model (e.g., a double ML model or an RNN model) that is to be used. In some embodiments, feature selection as described herein may be performed on the treatment features. The causal inference service 2100 may perform causal analysis for the inputs using a trained ML model to generate and output prioritized treatment features as described herein.

Illustrative System

In at least some embodiments, a computing device that implements a portion or all of the methods and apparatus described herein may include a general-purpose computer system that includes or is configured to access one or more computer-accessible media, such as computer system 4000 illustrated in FIG. 8. In the illustrated embodiment, computer system 4000 includes one or more processors 4010 coupled to a system memory 4020 via an input/output (I/O) interface 4030. Computer system 4000 further includes a network interface 4040 coupled to I/O interface 4030.

In various embodiments, computer system 4000 may be a uniprocessor system including one processor 4010, or a multiprocessor system including several processors 4010 (e.g., two, four, eight, or another suitable number). Processors 4010 may be any suitable processors capable of executing instructions. For example, in various embodiments, processors 4010 may be general-purpose or embedded processors implementing any of a variety of instruction set architectures (ISAs), such as the x86, PowerPC, SPARC, or MIPS ISAs, or any other suitable ISA. In multiprocessor systems, each of processors 4010 may commonly, but not necessarily, implement the same ISA.

System memory 4040 may be configured to store instructions and data accessible by processor(s) 4010. In various embodiments, system memory 4020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for identifying features that may have a high potential impact on key web-based application metrics based on observational data, are shown stored within system memory 4020 as code 4025 and data 4026.

In one embodiment, I/O interface 4030 may be configured to coordinate I/O traffic between processor 4010, system memory 4020, and any peripheral devices in the device, including network interface 4040 or other peripheral interfaces. In some embodiments, I/O interface 4030 may perform any necessary protocol, timing or other data transformations to convert data signals from one component (e.g., system memory 4020) into a format suitable for use by another component (e.g., processor 4010). In some embodiments, I/O interface 4030 may include support for devices attached through various types of peripheral buses, such as a variant of the Peripheral Component Interconnect (PCI) bus standard or the Universal Serial Bus (USB) standard, for example. In some embodiments, the function of I/O interface 4030 may be split into two or more separate components, such as a north bridge and a south bridge, for example. Also, in some embodiments some or all of the functionality of I/O interface 4030, such as an interface to system memory 4020, may be incorporated directly into processor 4010.

Network interface 4040 may be configured to allow data to be exchanged between computer system 4000 and other devices 4060 attached to a network or networks 4050, such as other computer systems or devices as illustrated in FIGS. 1 through 7, for example. In various embodiments, network interface 4040 may support communication via any suitable wired or wireless general data networks, such as types of Ethernet network, for example. Additionally, network interface 4040 may support communication via telecommunications/telephony networks such as analog voice networks or digital fiber communications networks, via storage area networks such as Fibre Channel SANs, or via any other suitable type of network and/or protocol.

In some embodiments, system memory 4020 may be one embodiment of one or more non-transitory computer-readable storage media configured to store program instructions and data as described above for FIGS. 1 through 7 for implementing embodiments of methods and apparatus for identifying features that may have a high potential impact on key web-based application metrics based on observational data. However, in other embodiments, program instructions and/or data may be received, sent or stored upon different types of computer-readable storage media. Generally speaking, a computer-readable medium may include non-transitory storage media or memory media such as magnetic or optical media, e.g., disk or DVD/CD coupled to computer system 4000 via I/O interface 4030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 4000 as system memory 4020 or another type of memory. Further, a computer-readable medium may include transmission media or signals such as electrical, electromagnetic, or digital signals, conveyed via a communication medium such as a network and/or a wireless link, such as may be implemented via network interface 4040.

CONCLUSION

Various embodiments may further include receiving, sending or storing instructions and/or data implemented in accordance with the foregoing description upon one or more non-transitory computer-readable storage media. Generally speaking, a computer-readable medium may include non-transitory storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising;
one or more processors; and
memory comprising program instructions that when executed on the one or more processors implement a causal inference engine configured to:
receive treatment feature data from a time period t−1 for one or more treatment features of an application, wherein the treatment features include features of interest in regard to a target metric of the application in a time period t;
receive control feature data for one or more control features of the application, wherein the control features include information about user behavior over a period of time and are not in the treatment features;
perform a causal analysis of the treatment features with respect to the target metric for the time period t−1 using the treatment feature data and the control feature data to generate prioritized treatment features with respect to estimated impact on the target metric; and
output the prioritized treatment features to an application testing process, wherein the application testing process prioritizes online testing of the application based on the prioritized treatment features to determine one or more of the treatment features that have an impact on the target metric that is above a specified threshold.

2. The system as recited in claim 1, wherein, to perform a causal analysis of the treatment features with respect to the target metric, the causal inference engine is configured to input the treatment feature data and the control feature data to a trained machine learning (ML) model.

3. The system as recited in claim 2, wherein the ML model is one of a double ML model or a Recurrent Neural Network (RNN) model.

4. The system as recited in claim 1, wherein the causal inference engine is further configured to perform feature selection on the treatment features prior to performing the causal analysis to reduce the number of treatment features based on correlations between the treatment features and correlations between the treatment features and the target metric.

5. The system as recited in claim 1, wherein the causal inference engine is configured to generate prioritized treatment features for two or more different categories of users.

6. The system as recited in claim 1, wherein the prioritized treatment features include indications of increase in usage of the treatment features with regard to the target metric and indications of global lift of the treatment features with regard to the target metric.

7. A method, comprising:
performing, by a causal analysis system implemented by one or more computing devices:
receiving treatment features and a target metric of an application in a time period t;
performing a causal analysis of the treatment features with respect to the target metric for a time period t−1 using the treatment features and control features for a time period prior to and including t−1 to generate prioritized treatment features with respect to estimated impact on the target metric; and
prioritizing online testing of the application based on the prioritized treatment features to determine one or more of the treatment features that have a higher impact on the target metric than the other treatment features.

8. The method as recited in claim 7, wherein the control features include information about user behavior over a prior period of time and are not in the treatment features.

9. The method as recited in claim 7, wherein performing a causal analysis of the treatment features with respect to the target metric comprises inputting the treatment feature data and the control feature data to a trained machine learning (ML) model.

10. The method as recited in claim 9, wherein the ML model is a double ML model.

11. The method as recited in claim 10, wherein performing the causal analysis of a given treatment feature with respect to the target metric using the double ML model comprises:
predicting the target metric using the control features;
predicting the treatment feature using the control features;
determining difference between an actual target metric and the predicted target metric;
determining difference between an actual treatment feature and the predicted treatment feature; and
performing a regression of the determined differences to obtain causal impact of the treatment feature on the target metric.

12. The method as recited in claim 9, wherein the ML model is Recurrent Neural Network (RNN) model.

13. The method as recited in claim 12, wherein performing the causal analysis of a given treatment feature with respect to the target metric using the RNN model comprises:
performing a first prediction using all of the features;
performing a second prediction with the given treatment feature zeroed out; and
determining difference between output of the first prediction and the second prediction to obtain causal impact of the treatment feature on the target metric.

14. The method as recited in claim 7, further comprising performing feature selection on the treatment features prior to performing the causal analysis to reduce the number of treatment features based on correlations between the treatment features and correlations between the treatment features and the target metric.

15. The method as recited in claim 7, further comprising generating prioritized treatment features for two or more different categories of users.

16. The method as recited in claim 7, wherein the prioritized treatment features include indications of increase in usage of the treatment features with regard to the target metric and indications of global lift of the treatment features with regard to the target metric.

17. The method as recited in claim 7, further comprising performing the causal analysis of the treatment features with respect to the target metric for one or more subsequent time periods to monitor impact of the treatment features on the target metric over time.

18. One or more non-transitory computer-readable storage media storing program instructions that when executed on or across one or more processors cause the one or more processors to:
obtain treatment features and a target metric of an application in a time period t; and
perform a causal analysis of the treatment features with respect to the target metric for a time period t−1 using the treatment features and control features for a time period prior to and including t−1 to generate prioritized treatment features with respect to estimated impact on the target metric, wherein the control features include information about user behavior over a prior period of time and are not in the treatment features; and prioritize online testing of the application based on the prioritized treatment features to determine one or more of the treatment features that have a higher impact on the target metric than the other treatment features.

19. The one or more non-transitory computer-readable storage media as recited in claim 18, wherein, to perform a causal analysis of the treatment features with respect to the target metric, the program instructions when executed on or across the one or more processors further cause the one or more processors to input the treatment feature data and the control feature data to a trained machine learning (ML) model.

20. The one or more non-transitory computer-readable storage media as recited in claim 19, wherein the ML model is one of a double ML model or a Recurrent Neural Network (RNN) model.

21. The one or more non-transitory computer-readable storage media as recited in claim 18, further storing program instructions that when executed on or across the one or more processors further cause the one or more processors to perform feature selection on the treatment features prior to performing the causal analysis to reduce the number of treatment features based on correlations between the treatment features and correlations between the treatment features and the target metric.

22. The one or more non-transitory computer-readable storage media as recited in claim 18, wherein the causal inference engine is configured to generate prioritized treatment features for two or more different categories of users.

23. The one or more non-transitory computer-readable storage media as recited in claim 18, wherein the prioritized treatment features include indications of increase in usage of the treatment features with regard to the target metric and indications of global lift of the treatment features with regard to the target metric.

* * * * *